(12) United States Patent
Moedinger et al.

(10) Patent No.: US 8,814,074 B2
(45) Date of Patent: Aug. 26, 2014

(54) BELT RETRACTOR INCLUDING A SWITCHABLE BELT FORCE LIMITER

(75) Inventors: Thomas Moedinger, Alfdorf (DE);
Martin Roehrle, Mutlangen (DE);
Wolfgang Holbein, Alfdorf (DE)

(73) Assignee: TRW Automotive GmbH, Alfdorf (DE)

( * ) Notice: Subject to any disclaimer, the term of this patent is extended or adjusted under 35 U.S.C. 154(b) by 266 days.

(21) Appl. No.: 12/628,463

(22) Filed: Dec. 1, 2009

(65) Prior Publication Data
US 2010/0155519 A1    Jun. 24, 2010

(30) Foreign Application Priority Data

Dec. 18, 2008 (DE) .......................... 10 2008 063 639

(51) Int. Cl.
*B60R 22/28* (2006.01)
*B60R 22/34* (2006.01)

(52) U.S. Cl.
USPC ..................................................... 242/379.1

(58) Field of Classification Search
USPC ............ 242/379.1, 382, 383.5; 280/805, 807; 297/471, 472, 475–478; 188/371, 372, 188/374, 375
See application file for complete search history.

(56) References Cited

U.S. PATENT DOCUMENTS

| | | | | |
|---|---|---|---|---|
| 3,632,060 A | * | 1/1972 | Balder ....................... | 242/379.1 |
| 6,616,081 B1 | * | 9/2003 | Clute et al. ................. | 242/379.1 |
| 6,692,027 B2 | * | 2/2004 | Siegfried et al. ............. | 280/805 |
| 2003/0071452 A1 | * | 4/2003 | Siegfried et al. ........... | 280/801.1 |
| 2004/0056136 A1 | * | 3/2004 | Blum et al. ................. | 242/379.1 |
| 2005/0224622 A1 | * | 10/2005 | Zolkower ................... | 242/379.1 |

FOREIGN PATENT DOCUMENTS

| | | | | |
|---|---|---|---|---|
| DE | 10015048 | | 10/2001 | |
| DE | 10113502 | | 9/2002 | |
| DE | 20207277 | | 10/2002 | |
| DE | 20214811 | | 3/2003 | |
| DE | 10146311 | | 4/2003 | |
| JP | 2004249968 A | * | 9/2004 | ............. B60R 22/28 |

* cited by examiner

*Primary Examiner* — Sang Kim
*Assistant Examiner* — Scott Haugland
(74) *Attorney, Agent, or Firm* — Tarolli. Sundheim, Covell & Tummino LLP

(57) ABSTRACT

A belt retractor (10) comprising a frame, a belt reel, a first force limiting means (30) coupled to the belt reel and a second force limiting means (32), wherein the second force limiting means (32) can be locked and the first force limiting means (30) is arranged functionally in series with the second force limiting means (32), is characterized in that the second force limiting means (32) includes a deformation element (52) and at least one deforming member (26, 54) fixed to the frame, the deformation element (52) being adapted to be rotated relative to the deforming member (26, 54) when the second force limiting means (32) is activated, whereby the deformation element (52) is deformed.

25 Claims, 5 Drawing Sheets

BELT RETRACTOR INCLUDING A SWITCHABLE BELT FORCE LIMITER

FIELD OF THE INVENTION

The invention relates to a belt retractor comprising a frame, a belt reel, a first force limiting means coupled with the belt reel and a second force limiting means, the second force limiting means being adapted to be locked and the first force limiting means being functionally arranged in series with the second force limiting means.

BACKGROUND OF THE INVENTION

Vehicle belt retractors include a force limiting means for preventing, in case of restraint, for instance in case of accident, the force acting on a vehicle occupant by a belt from increasing too strongly. From the state of the art belt retractors comprising two force limiting means are known which are functionally arranged in series and in which one force limiting means can be locked. In this way, different characteristic lines of the restraining forces are possible, for instance in order to adapt the belt retractor to the weight of a vehicle occupant.

It is the object of the invention to provide a belt retractor comprising two force limiting means functionally arranged in series which provides two differently high characteristic lines.

SUMMARY OF THE INVENTION

In accordance with the invention, a belt retractor of the type described in the beginning is provided in such way that the second force limiting means includes a deformation element and at least one deforming member fixed to the frame, the deformation element being adapted to be rotated relative to the deforming member upon activation of the second force limiting means, whereby the deformation element is deformed. The first force limiting means acts upon the second force limiting means which is adapted to be locked and is coupled to the latter in case of activation. If the second force limiting means is locked, exclusively the first force limiting means is active. If, on the other hand, the second force limiting means is enabled or activated, both force limiting means functionally arranged in series are simultaneously active. The second force limiting means includes a deformation element which is deformed upon rotation of the belt retractor. The restraining force of the second force limiting means is constant independently of the distance so that a reversing the belt reel by more than one turn is possible for the purpose of force limitation.

The deforming member may exhibit, for instance, projections which are adapted to deform the deformation element. The shape and the size of the projections permit simple adaptation of the second force limiter and thus of the belt retractor to a desired restraining force.

The projections are preferably constantly adjacent to the deformation element and continuously apply pressure to the same. The force level or the restraining force, respectively, is thus immediately available independently of the position of the deformation element or the projections. The deformation element need not be rotated against a stop or a projection before.

In a preferred embodiment, the deformation element is ring-shaped and the deforming member deforms the deformation element in axial direction. Thus the deformation element can exhibit a very flat design in parallel to a flange of the belt reel or a side member of the frame of the belt retractor.

Preferably two deforming members between which the deformation element is guided are provided. The deforming members preferably include projections that protrude in the direction of the respective other deforming member. When the deformation element is rotated between the two deforming members, it is alternately reformed so that the friction occurring and, in the case of major deformations, also the required reforming work provide the resisting force the second force limiter opposes to a reversal of the belt reel. In combination with a ring-shaped deformation element a longer belt extension is possible, especially over more than one revolution. Neglecting wear, an infinite number of revolutions of the belt reel is theoretically possible.

The second force limiting means can also include a transmission member to which the deformation element is connected in a torque-proof manner. The transmission member serves for stable mounting and support of the deformation element.

The transmission member has an annular shape, for instance, and is provided with an external torque transmission profile. The deformation element is held at said torque transmission profile in a torque-proof manner. In this way, the deformation element can be rotatably supported at a part of the belt retractor. The torque transmission profile provides a connection between the transmission member and the deformation element ensuring safe transmission of the forces occurring.

Preferably a locking means acting upon the transmission member and adapted to lock the second force limiting means is provided. The locking means consequently can arrest the second force limiting unit such that the deformation element is not loaded and the forces occurring are deflected while bypassing the second force limiting unit, for instance directly into the frame of the belt retractor.

For example, the locking means comprises a locking detent fixed to the frame which is adapted to engage in a recess of the transmission member and to lock the latter in a way fixed to the frame. Such locking detent can be a mechanical device so as to permit a simple and inexpensive arresting of the transmission member.

The second force limiting means can preferably be connected in a simple manner. Therefore, it is provided that the transmission member acts on the locking detent when the transmission member is rotated out of the recess, i.e. in accordance with a release of the locking. Consequently, the locking detent need not be actively moved out of the recess of the transmission member when the second force limiting means is to be activated.

In order to keep the locking detent in position in the recess of the transmission member, there is preferably provided a linearly movable bar adapted to keep the locking detent in the recess of the transmission member. At one position the linearly movable bar is adjacent to the locking detent and supports the same so that it cannot move out of the recess of the transmission member. At another position, the locking detent is released, on the other hand, so that in the case of strain on the transmission member it is automatically forced out of the recess. Such a linearly movable bar can moreover be easily controlled.

For the control of the bar an actuator adapted to move the linearly movable bar and thus to control the locking or activation of the second force limiting means is preferably provided. For this purpose a simple linear drive is sufficient so that no complex control mechanisms are required. For instance, a pyrotechnical actuator or a magnetic actor can be employed.

The first force limiting means preferably acts upon the transmission member of the second force limiting means and can be coupled to the transmission member. If the second force limiting means is locked, the force is directly transmitted from the first force limiting means to a component fixed to the frame and thus ultimately fixed to the vehicle. The second force limiting means, especially the deformation element, is not loaded. When the locking of the second force limiting means is released, the force flows via the transmission member and the deformation element of the second force limiting means to a component fixed to the frame and thus ultimately fixed to the vehicle.

In order to permit a simple coupling of the first force limiting means to the second force limiting means, the transmission member includes stop teeth in which a catch assigned to the belt reel can engage.

The stop teeth are preferably provided at the inside of the transmission member in the form of a stop wheel and the catch can be controlled to engage radially outwardly in the stop teeth, thereby permitting a compact design.

The characteristic line of the second force limiting means is preferably lower than the characteristic line of the first force limiting means. If the force limiting means are connected in series, exclusively the second weaker force limiting means is deformed. The first force limiting means in this case merely serves for force transmission. The belt retractor thus can be changed between the different characteristic lines so that it is possible to adapt the restraining force of the belt retractor to the weight of the vehicle occupant to be restrained.

The first force limiting means can also include two force limiters arranged functionally in parallel, thereby permitting an even better adaptation of the force path of the force limiting means.

The first force limiting means may include, for instance, a torsion rod arranged inside the belt reel in a space-saving manner.

The first force limiting means may also exhibit a cutting insert, however, that permits an individual adaptation of the characteristic line by an appropriate shape of the surface to be cut.

The torsion rod and the cutting insert can also be connected functionally in parallel. In this way the belt retractor and the first force limiting means can be individually adapted.

An additional force limiter can also be connected in parallel to the second force limiter. Thus, in the case of a low characteristic line, a degression (analogous to the high characteristic line) becomes possible.

The first force limiting means may have, for instance, a degressive or progressive force path. In the case of a progressive force path, the extension force of the belt increases upon increasing belt extension. In the case of a degressive characteristic line, the extension force decreases upon increasing length of extension of the belt.

The first and/or second force limiting means may also have a linear forth path so that the extension force is equal over the entire length of extension.

DESCRIPTION OF EXAMPLE EMBODIMENTS

Figure 1:
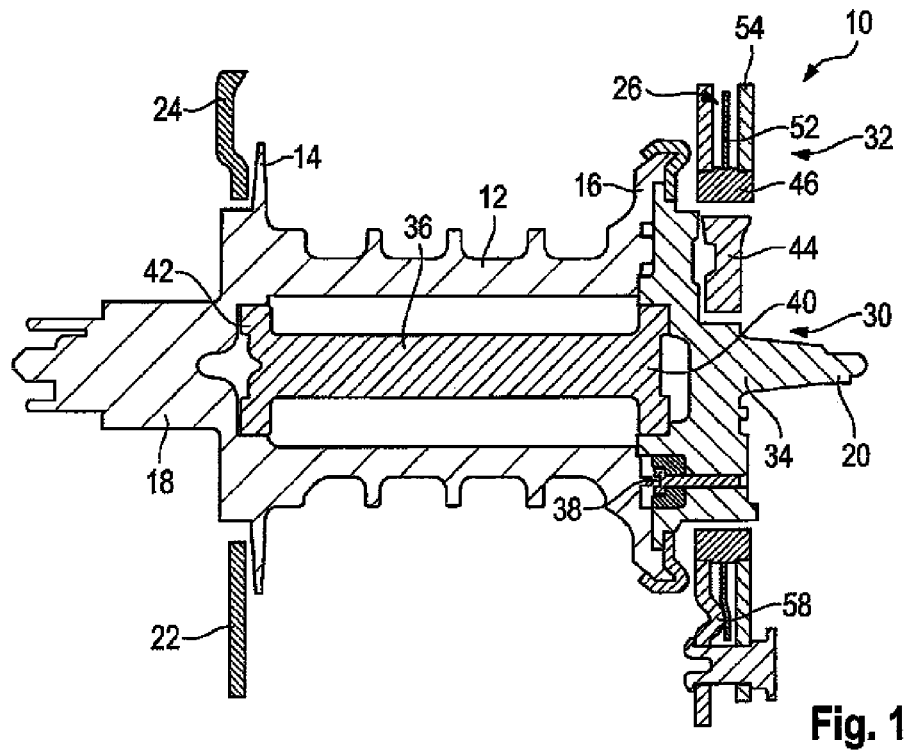
FIG. 1 is a sectional view of a belt retractor according to the invention.
Figure 2:
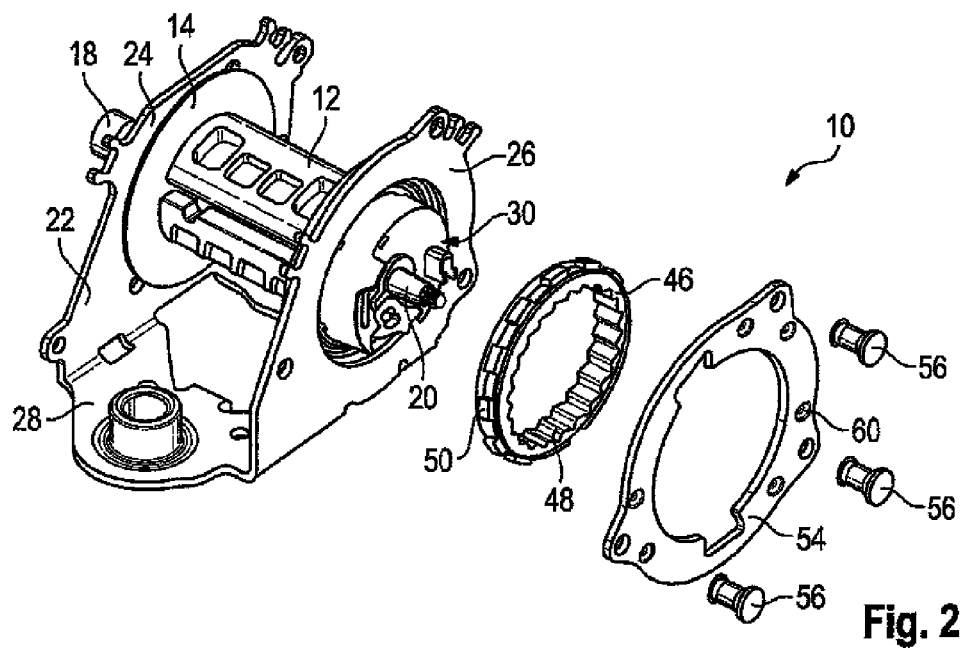
FIG. 2 shows an exploded view of the belt retractor from FIG. 1.

FIG. 1 illustrates a belt retractor 10 according to the invention comprising a belt reel 12 having a left-hand flange 14 as well as a right-hand flange 16 viewed with respect to FIG. 1. The belt reel 12 is rotatably supported in a frame 22 by a left-hand support axis 18 and a right-hand hub 20 viewed with respect to FIG. 1. The frame 22 includes a left-hand side member 24 and a right-hand side-member 26, each being mounted at right angles to a mounting portion 28 (cf. FIG. 2).

The belt retractor 10 has a first force limiting means 30 and a second force limiting means 32. The first force limiting means 30 is permanently connected to the belt reel and can be connected to the second force limiting means 32 via a disk-shaped coupling member 34.

The first force limiting means 30 has a torsion rod 36 as well as a cutting insert 38 arranged functionally in parallel thereto. The torsion rod 36 is held at the coupling member 34 in a torque-proof manner by a right-hand end 40 viewed with respect to FIG. 1, the left-hand end 42 is mounted to the belt reel 12 in a torque-proof manner. The cutting insert 38 is arranged to be axially projecting from the coupling member 34 and acts on the right-hand flange 16 of the belt reel 12. When twisting the belt reel 12 against the coupling member 34, material of the flange 16 is cut.

Instead of the torsion rod 36 or the cutting insert 38, the first force limiting means 30 can also include other known force limiters or a combination of known force limiters. In particular, the first force limiting means may also comprise only one force limiter, however.

In order to connect the first force limiting means 30 to the second force limiting means 32, a catch 44 adapted to be swiveled radially outwardly to engage in a transmission member 46 of the second force limiting means 32 is provided at the coupling member 34 of the first force limiting means 30. The transmission member 46 is ring-shaped in this case and partly encloses the coupling member 34. Stop teeth 48 in which the catch 44 can engage are provided at the inside of the transmission member 46.

Figure 3:
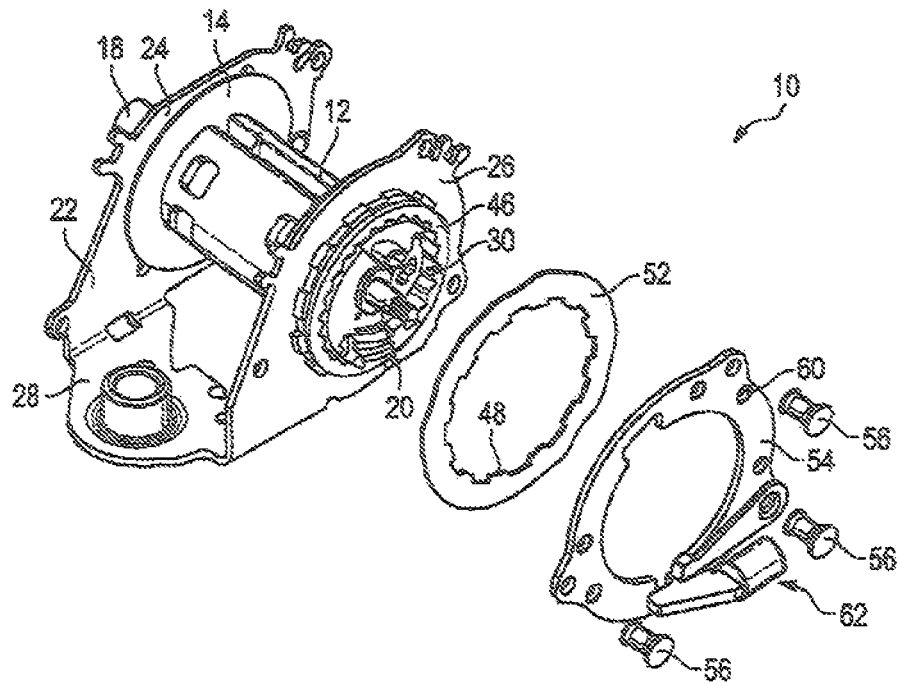
FIG. 3 is another exploded view of the belt retractor from FIG. 1.

At the outside of the transmission member 46 likewise a torque transmission profile 50 is arranged through which a disk-shaped annular deformation element 52 is mounted at the transmission member 46 (cf. FIG. 3).

Figure 4:
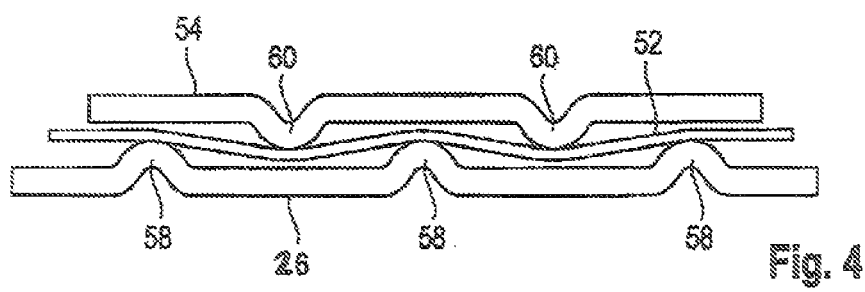
FIG. 4 is a detail view of the second force limiting means of the belt retractor from FIG. 1.

A disk 54 mounted in a torque-proof manner at the frame 22, in this case at the side member 26, by appropriate fasteners 56, rivets in this case, is arranged in parallel to the right-hand side member 26 of the frame 22. The deformation element 52 is thus disposed between the side member and the disk 54. The side member 26 and the disk 54 form respective deforming members and include projections 58, 60 each projecting axially in the direction of the deformation element 52 (FIG. 4). The projections are constantly adjacent to the deformation element 52 and thus continuously apply pressure to the same.

When rotating the transmission member 46, the deformation element is alternately deformed by the projections 58, 60 so that a resisting force is provided by the friction produced or the deforming operation.

Figure 5:
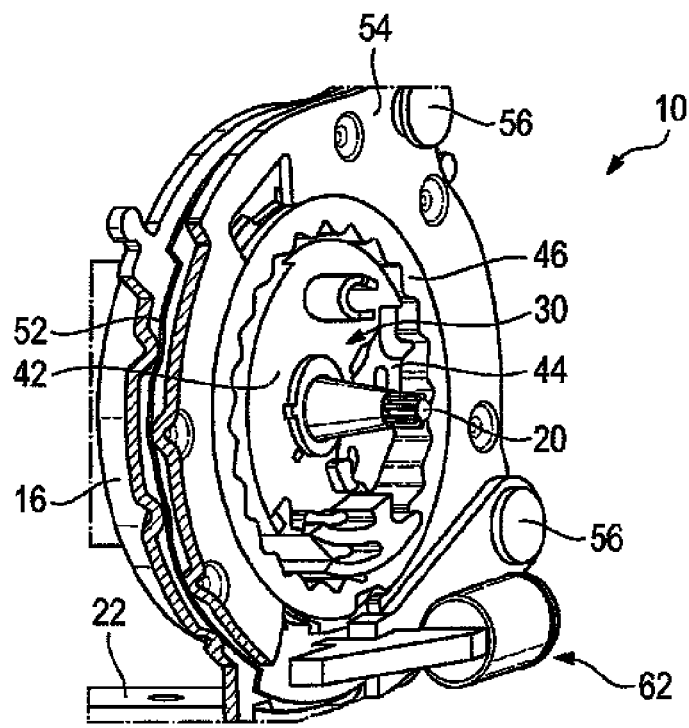
FIG. 5 is a second detail view of the second force limiting means of the belt retractor from FIG. 1.
Figure 6:
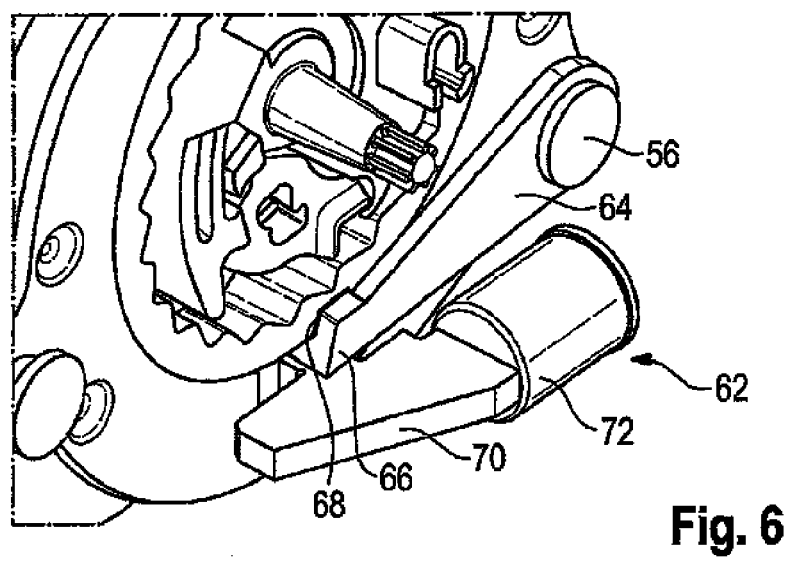
FIG. 6 is a detail view of the locking means of the belt retractor from FIG. 1.

In order to be able to lock the second force limiting means 32 fixed to the vehicle a locking means 62 fixed to the frame is provided to act upon the transmission member 46 of the second force limiting means 32 (cf. FIGS. 5 and 6).

The locking means 62 has a pivoting locking detent 64 which is pivoted at the frame 22 by one of the fasteners 56. The fastening may also be effectuated deviating therefrom at a different position of the frame 22, however. The locking detent 64 includes a projection 66 adapted to engage in a recess 68 at the radial outside of the transmission member 46. In this way, the transmission member 46 and thus the second force limiting means 32 can be locked so as to be fixed to the vehicle. When rotating the transmission element 46 the projection 66 of the locking detent 64 is pushed out of the recess 68, however, so that the locking is automatically released.

Figure 7:
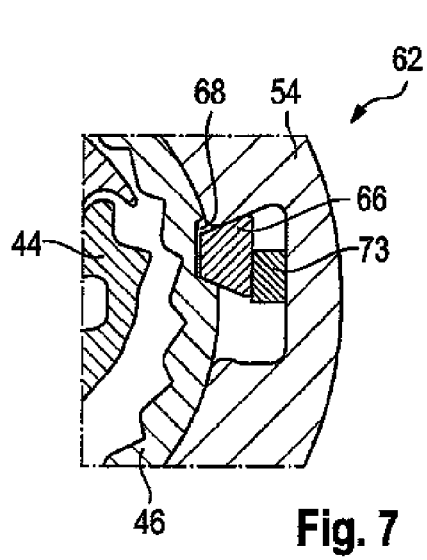
FIG. 7 shows a sectional view across the locking mechanism from FIG. 6.
Figure 8:
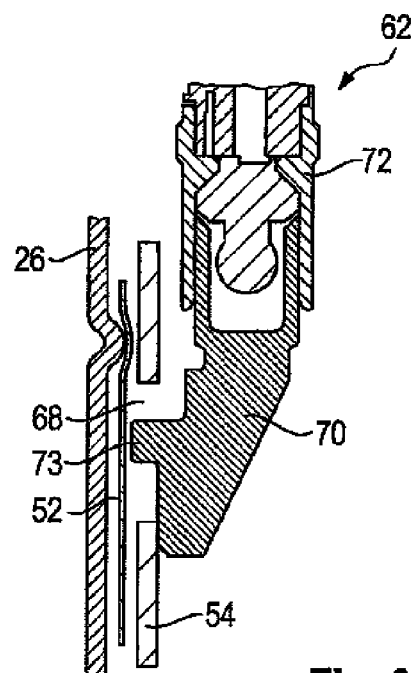
FIG. 8 shows a sectional view of the locking mechanism from FIG. 6 in the locked state.

In order to prevent this, a linearly displaceable bar 70 is provided which is moved in a direction extending substantially tangentially with respect to the belt reel 12 by an actuator 72. The bar 70 has an axial projection 73 which, at one position of the bar 70, is adjacent to the locking detent 64 and fixes the same at that position in the recess 68 of the transmission member 46 (FIGS. 7 and 8).

Figure 9:
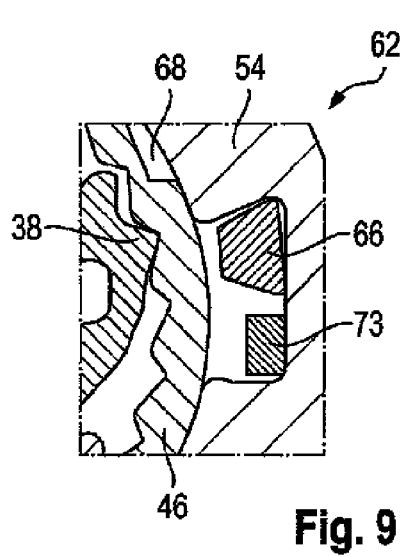
FIG. 9 is a second sectional view of the locking mechanism from FIG. 9.
Figure 10:
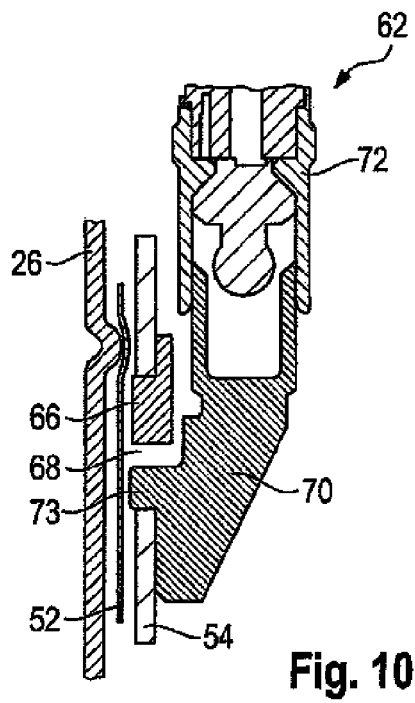
FIG. 10 shows the locking mechanism from FIG. 6 in the unlocked state.

If the bar 70 is linearly shifted by the actuator 72 until the projection 73 is no longer adjacent to the locking detent 64, the projection 66 of the locking detent 64 can be pushed, upon a rotation of the transmission member 46, by the latter radially outwardly out of the recess 68 so that the locking of the transmission member 46 and thus of the second force limiting means 32 is released (FIGS. 9 and 10).

The actuator 72 of the bar 70 can be a motor or a pyrotechnical drive, for instance. But also other suitable linear drives can be employed.

Figure 11:
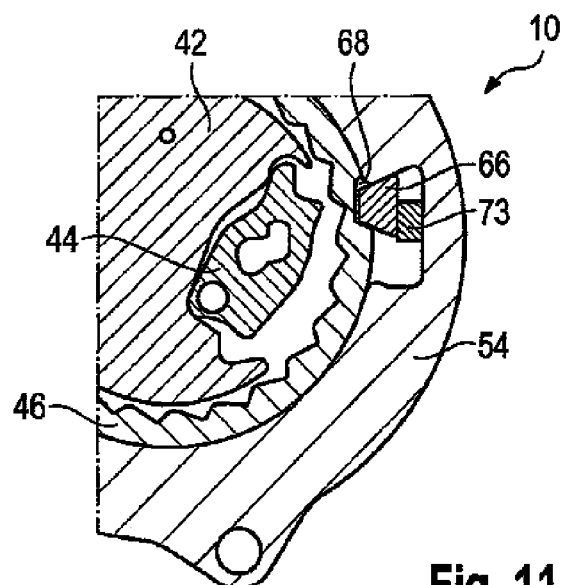
FIG. 11 shows a first sectional view of the locking mechanism from FIG. 11.

Prior to force limitation, the transmission member 46 is locked in any case (FIG. 11). The force is thus limited exclusively by the first force limiting means 30. The force is transmitted via the transmission member 46 of the second force limiting means 32 and the locking means 62 to the frame 22 or a component fixed to the vehicle. The second force limiting means 32, especially the deformation element 52, is not loaded in this way. In this operating state the function of the belt retractor 10 corresponds to that of a conventional belt retractor having two force limiters arranged functionally in parallel.

Figure 12:
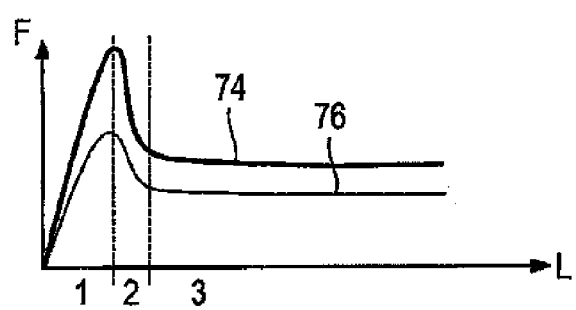
FIG. 12 shows the characteristic line of a belt retractor from the state of the art.

The characteristic line of such belt retractor 10 is shown, for instance, in the diagram represented in FIG. 12 in which the extension force F required for a belt extension is shown in proportion to the belt extension length L. After locking the belt reel, first a small belt extension takes place with an increasing extending force F due to the belt elongation and the reel of film effect (range 1). Subsequently, the extension force decreases in a range 2 by the response of the force limiters until the extension force remains constant while the belt is further extended (range 3).

The shown belt retractor can be changed between two characteristic lines prior to the force limitation. The upper characteristic line 74 corresponds to the state using two force limiters connected in parallel. The force limiters thus can absorb higher kinetic energy, as required for a heavy-weight vehicle occupant, for instance. For light-weight persons or in the case of minor delays a force limitation on a lower level is sufficient, as shown, for instance in the lower characteristic line 76. This characteristic line can be obtained, for example, by deactivating a force limiter. But the first force limiting means 30 can also show a different characteristic line depending on the force limiters employed or the desired force limiting behavior.

When the locking of the second force limiting means 32 is released by displacing the bar 70, the second force limiting means is connected functionally in series with the first force limiting means 30. Depending on the "hardness" of the first and second force limiting means 30, 32, different characteristic lines are possible.

If the second force limiting means is "softer" than the first force limiting means 30, the force is exclusively limited by the second force limiting means 32. In this case the first force limiting means 30 is not utilized but serves merely for force transmission. The characteristic line is linear in this case, as the second force limiter offers a constant extension force over the entire belt extension.

If the first force limiting means 30 and the second force limiting means 32 have the same level of force, with an equal extension force both force limiting means 30, 32 are deformed so that the resulting deformation is higher. Thus, with an equal extension force the belt is extended more and, respectively, with an equal belt extension the extension force is less. This operating state is suited, for instance, for vehicle occupants of lower weight.

The belt retractor 10 according to the invention moreover offers the advantage that the second force limiting means 32 can be connected during locking of the belt reel 10. By release of the locking the second force limiting means 32 can be activated at any time and the force limiter can thus be changed to a lower characteristic line.

In the home position the second force limiting means 32 is locked so that at the beginning the higher force level is provided in any case. If a lower restraining force is sufficient, for instance in the case of a light-weight vehicle occupant, the second force limiting means can be easily activated by activating the actuator 72 and displacing the bar 70. In this way, at the beginning of force limitation the belt retractor 10 has a high characteristic line with a high restraining force, for instance, which is changed to a lower characteristic line, i.e. a lower restraining force, after a predefined period of time.

Figure 13:
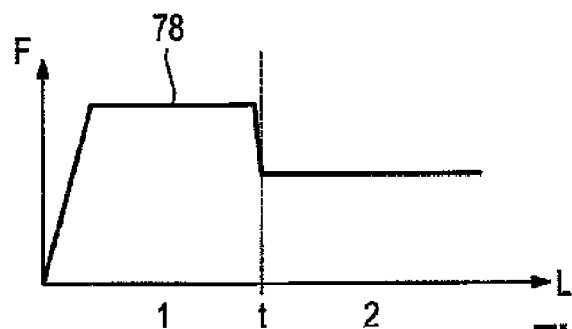
FIG. 13 shows a characteristic line of the belt retractor from FIG. 1.

FIG. 13 shows the characteristic line 78 for such case. In a range 1 at the beginning of force limitation the restraining force is at a high level. After a predetermined time t the second force limiting means 32 is activated, whereby the characteristic line 78 falls to a lower level (range 2).

By an appropriate selection or an adaptation of the first force limiting means 30, it is thus possible to further adapt the characteristic line 78. For instance, after an increasing force limitation a decreasing force limitation is possible.

Instead of the locking means 62 of the second force limiting means used here, also a different design is possible which is suited to lock the second force limiting means 32 in a torque-proof manner. In particular, the locking means 62 need not have a radially engaging projection 66. Nor does the locking means 62 have to engage in the radially outer edge of the transmission member 46. Moreover, embodiments including no transmission member 46 are imaginable so that the locking means 62 acts directly upon the deformation element 52.

Also, the coupling of the first and second force limiting means 30, 32 can be effectuated in any other suitable manner. In particular, this need not be done by a catch 44.

The deformation element 52 can also have a different design deviating from the annular design shown here. Especially the deformation element 52 need not be supported between two components 26, 54 fixed to the vehicle. The deformation element 52 can also be deformed by only one deforming member. The deforming member especially need not be part of the frame 22.

The projections 58, 60 need not be constantly adjacent to the deformation element 52, either. It is also possible that the projections 58, 60 are guided against the deformation element 52 exclusively from one side. In particular, the deformation element 52 can also be deformed directly by a component fixed to the vehicle.

The deformation element 52 may also be supported at the transmission member 40 of the second force limiting means 32 in any other way. Especially embodiments having no transmission member 46 are imaginable.

The force limiter described here can also be used in a belt retractor having a locking means unlike the one shown here.

The invention claimed is:

1. A belt retractor (10) comprising a frame having a side member defining a first fixed deforming member (26), a belt reel (12) rotatable about an axis, a first force limiting structure (30) coupled to the belt reel (12) and a second force limiting structure (32), the second force limiting structure (32) being adapted to be locked and the first force limiting structure (30) being functionally arranged in series with the second force limiting structure (32), wherein the second force limiting structure (32) includes a deformation element (52) and a second fixed deforming member (54) comprising a disk that is secured to the first fixed deforming member (26), the deformation element (52) being positioned axially between the deforming members (26, 54) and being rotated with the belt reel (12) about the axis of the belt reel (12) relative to the deforming members (26, 54) upon activation of the second force limiting structure (32), whereby the deformation element (52) is deformed, the deformation element (52) being ring-shaped and the deforming members (26, 54) deforming the deformation element (52) in an axial direction, each of the deforming members (26, 54) including a plurality of projections (58, 60) that extend axially towards the deformation element (52) for deforming the deformation element (52) when the deformation element (52) rotates relative to the deforming members (26, 54), at least one of the plurality of projections (58, 60) having a rounded protrusion on one side of the respective deforming member (26, 54) and a corresponding indentation in another side of the respective deforming member (26, 54) opposite the rounded protrusion.

2. A belt retractor according to claim 1, wherein the projections (58, 60) are constantly adjacent to the deformation element (52) and continuously apply pressure to the same.

3. A belt retractor according to claim 1, wherein the disk (54) is fixed to the frame.

4. A belt retractor according to claim 1, wherein the second force limiting structure (32) includes a transmission member (46) and the deformation element (52) is fixedly connected thereto.

5. A belt retractor according to claim 4, wherein the transmission member (46) is ring-shaped and is provided with an external torque transmission profile (50) at which the deformation element (52) is held.

6. A belt retractor according to claim 5, wherein the first force limiting structure (30) acts upon the transmission member (46) of the second force limiting structure (32) and can be coupled to the transmission member (46), respectively.

7. A belt retractor according to claim 6, wherein the transmission member (46) includes stop teeth (48) in which a catch (44) associated with the belt reel (12) can engage.

8. A belt retractor according to claim 7, wherein the stop teeth (48) are provided at the inside of the transmission member (46) and the catch (44) is pivotable radially outwardly into engagement with the stop teeth.

9. A belt retractor according to claim 4, wherein a locking structure (62) is provided which acts upon the transmission member (46) and is adapted to lock the second force limiting structure (32).

10. A belt retractor according to claim 9, wherein the locking structure (62) includes a locking detent (64) fixed to the frame which is adapted to engage in a recess (68) of the transmission member (46) to lock the transmission member (46) to the frame.

11. A belt retractor according to claim 10, wherein the transmission member (46) acts on the locking detent (64) when the transmission member (46) is rotated to urge the locking detent (64) out of the recess (68) to unlock the transmission member (46) from the frame.

12. A belt retractor according to claim 10, wherein a linearly movable bar (70) adapted to keep the locking detent (64) in the recess (68) of the transmission member (46) is provided.

13. A belt retractor according to claim 12, wherein the locking structure (62) has an actuator (72) adapted to move the linearly displaceable bar (70) and in this way control the locking or activation of the second force limiting structure (32).

14. A belt retractor according to claim 1, wherein the characteristic line of the second force limiting structure (32) is lower than the characteristic line of the first force limiting structure (30).

15. A belt retractor according to claim 1, wherein the first force limiting structure (30) includes two force limiters (36, 38) arranged functionally in parallel.

16. A belt retractor according to claim 1, wherein the first force limiting structure (30) includes a torsion rod (36).

17. A belt retractor according to claim 16, wherein the first force limiting structure (30) includes the torsion rod (36) and a cutting insert (38) that are connected functionally in parallel.

18. A belt retractor according to claim 1, wherein the first force limiting structure (30) includes a cutting insert (38).

19. A belt retractor according to claim 1, wherein the first force limiting structure (30) has a degressive or progressive force path.

20. A belt retractor according to claim 1, wherein the first and/or the second force limiting structure (30, 32) have a linear force path.

21. A belt retractor according to claim 1, wherein at least one of the plurality of projections (58, 60) has a substantially hemispherical shape.

22. A belt retractor according to claim 1, wherein the second fixed deforming member (54) includes a portion extending along a plane and at least one of the plurality of projections (60) includes a circular cross-section positioned entirely within the plane.

23. A belt retractor comprising:
a frame having a side member defining a first fixed deforming member (26) that includes a first plurality of projections (58);
a belt reel (12) rotatable about an axis;
a first force limiting structure (30) including a torsion bar (36) having a first end (42) secured to the belt reel and a second end (40) secured to a coupling member (34);
a second force limiting structure (32) adapted to be locked in an inactive state by a locking detent (64) pivotably fixed to the frame and being functionally arranged in series with the first force limiting structure (30), the second force limiting structure (32) including:
a second fixed deforming member (54) comprising a disk secured to the first fixed deforming member (26) and including a second plurality of projections (60);
a ring-shaped transmission member (46) encircling the coupling member (34) and having an external torque transmission profile (50), the transmission member (46) having a recess (68) which is engaged with the locking detent (64) in the inactive state of the second force limiting structure (32) to lock the transmission member (46) against rotation relative to the frame;
a catch (44) on the coupling member (34) for selectively locking the transmission member with the coupling member (34); and
a ring-shaped deformation element (52) secured to the torque transmission profile (50) of the transmission member (46);
the second fixed deforming member (54) being positioned axially between the locking detent (64) and the deformation element (52);
the deformation element (52) being positioned axially between the deforming members (26, 54) and being rotatable with the belt reel about the axis of the belt reel relative to the deforming members (26, 54) when the transmission member (46) is locked with the coupling member (34) and the second force limiting structure (32) is activated by allowing the locking detent (64) to be disengaged from the recess (68) such that the plurality of projections (58, 60) on the deforming members (26, 54) deform the deformation element (52) in an axial direction.

24. A belt retractor according to claim 23, wherein at least one of the plurality of projections (58, 60) has a substantially hemispherical shape.

25. A belt retractor according to claim 23, wherein the second fixed deforming member (54) includes a portion extending along a plane and at least one of the plurality of projections (60) includes a circular cross-section positioned entirely within the plane.

* * * * *